(12) United States Patent  
Masuyama et al.

(10) Patent No.: US 7,443,436 B2  
(45) Date of Patent: Oct. 28, 2008

(54) IMAGE PICKUP SYSTEM FOR PREVENTING IMAGE DARKENING DUE TO THE ENTRANCE OF INTENSE LIGHT

(75) Inventors: Masayuki Masuyama, Nagaokakyo (JP); Yoshiyuki Matsunaga, Kamakura (JP); Masashi Murakami, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 634 days.

(21) Appl. No.: 11/098,618

(22) Filed: Apr. 5, 2005

(65) Prior Publication Data

US 2005/0225653 A1    Oct. 13, 2005

(30) Foreign Application Priority Data

Apr. 13, 2004    (JP) .............................. 2004-118337

(51) Int. Cl.
*H04N 5/335*    (2006.01)

(52) U.S. Cl. ...................................... 348/294
(58) Field of Classification Search ................ 348/241, 348/246, 247, 302, 308
See application file for complete search history.

(56) References Cited

U.S. PATENT DOCUMENTS

| 6,307,393 | B1 * | 10/2001 | Shimura ...................... 324/765 |
| 6,683,643 | B1 * | 1/2004 | Takayama et al. ........... 348/247 |
| 6,781,624 | B1 * | 8/2004 | Takahashi ................... 348/241 |
| 6,977,363 | B2 | 12/2005 | Kokubun |
| 7,268,812 | B2 * | 9/2007 | Sato et al. ................... 348/246 |
| 7,279,668 | B2 * | 10/2007 | Misek ...................... 250/208.1 |

FOREIGN PATENT DOCUMENTS

| CN | 1437392 A | 8/2003 |
| EP | 1 067 766 A2 | 1/2001 |
| JP | 61-128681 | 6/1986 |
| JP | 2000-287131 A | 10/2000 |
| JP | 2001-024949 A | 1/2001 |

* cited by examiner

*Primary Examiner*—Lin Ye  
*Assistant Examiner*—Amy Hsu  
(74) *Attorney, Agent, or Firm*—McDermott Will & Emery LLP

(57) ABSTRACT

The image pickup device comprises: an image pickup unit 1 in which a plurality of unit cells for generating reset and read voltages are arranged; a noise eliminating unit 6 for generating, with respect to each unit cell, a differential voltage corresponding to a difference between the reset and read voltages; and output units 5 and 7 for outputting the read and differential voltages, respectively, to a signal processing apparatus. The signal processing apparatus comprises: a judging unit 8 for judging whether each of the read voltages is within a predetermined range; and a system output unit 9 for outputting, for unit cells whose voltages are judged as being within the predetermined range, corresponding differential voltages as luminance information of the unit cells; for unit cells whose voltages are judged as not being within the predetermined range, a predetermined voltage indicating high luminance as luminance information of the unit cells.

10 Claims, 15 Drawing Sheets

IMAGE PICKUP SYSTEM FOR PREVENTING IMAGE DARKENING DUE TO THE ENTRANCE OF INTENSE LIGHT

BACKGROUND OF THE INVENTION

[1] Field of the Invention

The present invention relates to an image pickup system in which a plurality of unit cells each performing photoelectric conversion on light incident thereto are arranged on a semiconductor substrate in a one- or two-dimensional array, in particular to a technology for preventing a phenomenon that images become dark due to the entrance of intense light.

[2] Description of the Related Art

Late years, image pickup systems using an image pickup apparatus are commonly used, and representative examples of such image pickup systems are home video cameras and digital still cameras.

Some of these image pickup systems have an amplified image sensor as the image pickup apparatus.

Although having excellent characteristics such as a low noise level, amplified image sensors have a problem that images are subject to darkening due to the entrance of intense light.

In Japanese Laid-Open Patent Application No. 2000-287131 (Patent Reference 1), disclosed are an overview of a CMOS image sensor, which is an amplified image sensor, the same problem described above, and the CMOS image sensor that detects, with respect to each pixel sensor, an input of intense light based on a reset output voltage and replaces the voltage at the reset with another voltage. Patent Reference 1 describes therein that the CMOS image sensor is capable of preventing the aforementioned problem.

In Patent Reference 1, change in output voltages at the reset is used as an index for detecting pixel sensors that will cause image darkening. However, the change in output voltages at the reset is the very cause leading to image darkening, and has a direct effect on luminance information even if the amount of the change is small.

However, the change in output voltages at the reset cannot be detected unless the amount of the change reaches a certain magnitude. Thus, it is difficult to completely eliminate the adverse effect caused by the change in output voltages at the reset.

In addition, the change in output voltages at the reset as a result of an input of intense light is characteristically abrupt and is difficult to be detected with precision. Consequently, it is not an easy task to ensure prevention of image darkening.

For example, when an object taken by the CMOS image sensor, disclosed in Patent Reference 1, has a sufficiently bright central portion and a periphery gradually darkening outwards, it is possible to prevent the sufficiently bright central region on the taken image from darkening. However, in the periphery, a portion close to the boundary with the region prevented from darkening becomes darker although it should be light. Depending on the luminance distribution on the object, a ring-shaped darkened portion may appear.

SUMMARY OF THE INVENTION

The present invention aims at offering an image pickup system, an image pickup device, a signal processing apparatus, a signal processing method, and a signal processing program which are capable of resolving a problem of image darkening due to the entrance of intense light in a more reliable fashion than the conventional means and responsibly eliminating adverse effects caused by change in voltages at a reset.

In order to accomplish the above objectives, the image pickup system of the present invention comprises an image pickup device and a signal processing apparatus, for outputting luminance information corresponding to an amount of received light to an apparatus used in a subsequent stage. The image pickup device includes: an image pickup unit in which a plurality of unit cells are arranged in a one- or two-dimensional array, each of the plurality of unit cells including a photoelectric converter corresponding to a single pixel and an output unit operable to generate and output a reset voltage according to an output voltage from the photoelectric converter at an initialization as well as a read voltage according to an output voltage from the photoelectric converter corresponding to the amount of the received light; a differential voltage generating unit operable to generate, with respect to each of the plurality of unit cells, a differential voltage according to a difference between the reset voltage and the read voltage; and a device output unit operable to output, with respect to each of the plurality of unit cells, the read voltage and the differential voltage to the signal processing apparatus. The signal processing apparatus includes: a designating unit operable to designate, from among the plurality of unit cells, two or more unit cells as correction targets based on a judgment of whether read voltages outputted by the device output unit for the plurality of unit cells are respectively within a predetermined range; and a system output unit operable to output, for a unit cell being not one of the designated unit cells, the differential voltage of the unit cell as luminance information corresponding to the unit cell, and output, for a unit cell being one of the designated unit cells, a predetermined voltage indicating high luminance as luminance information corresponding to the unit cell.

In order to accomplish the above objectives, the image pickup device of the present invention comprises: an image pickup unit in which a plurality of unit cells are arranged in a one- or two-dimensional array, each of the plurality of unit cells including a photoelectric converter corresponding to a single pixel and an output unit operable to generate and output a reset voltage according to an output voltage from the photoelectric converter at an initialization as well as a read voltage according to an output voltage from the photoelectric converter corresponding to the amount of the received light; a differential voltage generating unit operable to generate, with respect to each of the plurality of unit cells, a differential voltage according to a difference between the reset voltage and the read voltage; and a device output unit operable to output, with respect to each of the plurality of unit cells, the read voltage and the differential voltage.

In order to accomplish the above objectives, the signal processing apparatus of the present invention receives a reset voltage and a differential voltage of each of a plurality of unit cells from an image pickup device, and processes the reset and the differential voltages. The reset voltage corresponds to an output voltage from a photoelectric converter at an initialization, and the differential voltage corresponds to a difference between the reset voltage and a read voltage according to an output voltage from the photoelectric converter corresponding to an amount of received light. The signal processing apparatus comprises: a designating unit operable to designate, from among the plurality of unit cells, two or more unit cells as correction targets based on a judgment of whether read voltages outputted from the image pickup device for the plurality of unit cells are respectively within a predetermined range; and an output unit operable to output, for a unit cell being not one of the designated unit cells, the differential voltage of the unit cell as luminance information corresponding to the unit cell, and output, for a unit cell being one of the designated unit cells, a predetermined voltage indicating high luminance as luminance information corresponding to the unit cell.

In order to accomplish the above objectives, the signal processing method of the present invention includes receiving a reset voltage and a differential voltage of each of a plurality of unit cells from an image pickup device, and processing the reset and the differential voltages. The reset voltage corresponds to an output voltage from a photoelectric converter at an initialization, and the differential voltage corresponds to a difference between the reset voltage and a read voltage according to an output voltage from the photoelectric converter corresponding to an amount of received light. The signal processing method comprises the steps of: (a) designating, from among the plurality of unit cells, two or more unit cells as correction targets based on a judgment of whether read voltages outputted from the image pickup device for the plurality of unit cells are respectively within a predetermined range; and (b) outputting, for a unit cell being not one of the designated unit cells, the differential voltage of the unit cell as luminance information corresponding to the unit cell, and output, for a unit cell being one of the designated unit cells, a predetermined voltage indicating high luminance as luminance information corresponding to the unit cell.

In order to accomplish the above objectives, the signal processing program of the present invention is used in a signal processing apparatus for receiving a reset voltage and a differential voltage of each of a plurality of unit cells from an image pickup device, and processing the reset and the differential voltages. The reset voltage corresponds to an output voltage from a photoelectric converter at an initialization, and the differential voltage corresponds to a difference between the reset voltage and a read voltage according to an output voltage from the photoelectric converter corresponding to an amount of received light. The signal processing program makes a computer execute the steps of: (a) designating, from among the plurality of unit cells, two or more unit cells as correction targets based on a judgment of whether read voltages outputted from the image pickup device for the plurality of unit cells are respectively within a predetermined range; and (b) outputting, for a unit cell being not one of the designated unit cells, the differential voltage of the unit cell as luminance information corresponding to the unit cell, and output, for a unit cell being one of the designated unit cells, a predetermined voltage indicating high luminance as luminance information corresponding to the unit cell.

Herewith, output voltages having the potentiality of causing image darkening are each replaced with a voltage indicating high luminance with the use of voltages at a reading (i.e. read voltages) as an index for detecting pixel sensors causing image darkening. Thus, the above configurations provide a sufficient measure of dealing with even incident light having a considerably lower intensity than incident light which creates change in output voltages at a reset causing image darkening and the like.

Accordingly, the above configurations are capable of resolving the problem of image darkening due to the entrance of intense light in a more reliable fashion than the conventional means, and responsibly eliminating adverse effects caused by change in voltages at the reset.

In the image pickup system, the designating unit may include: a judging unit operable to make the judgment; and a selecting unit operable to select, from among unit cells having read voltages judged as not being within the predetermined range, two or more unit cells as the correction targets based on differential voltages outputted by the device output unit for the plurality of unit cells.

In the signal processing apparatus, the designating unit may include: a judging unit operable to make the judgment; and a selecting unit operable to select, from among unit cells having read voltages judged as not being within the predetermined range, two or more unit cells as the correction targets based on differential voltages outputted by the image pickup device for the plurality of unit cells.

In the signal processing method, the step (a) may include the sub-steps of: (c) making the judgment; and (d) selecting, from among unit cells having read voltages judged as not being within the predetermined range, two or more unit cells as the correction targets based on differential voltages outputted by the device output unit for the plurality of unit cells.

In the signal processing program, the step (a) may include the sub-steps of: (c) making the judgment; and (d) selecting, from among unit cells having read voltages judged as not being within the predetermined range, two or more unit cells as the correction targets based on differential voltages outputted by the device output unit for the plurality of unit cells.

Herewith, by taking into account differential voltages in addition to using voltages at a reading as an index for detecting pixel sensors causing image darkening, output voltages in blocks assumed to be causing image darkening are each replaced with a voltage indicating high luminance. Note that the term "blocks" is used in this application to describe individually discrete areas, each of which is composed of spatially contiguous pixels causing darkening on an image. Thus, the above configurations provide a sufficient measure of dealing with even incident light having a considerably lower intensity than incident light which creates change in output voltages at a reset causing image darkening and the like.

Accordingly, the above configurations are capable of resolving the problem of image darkening due to the entrance of intense light in a more reliable fashion than the conventional means, and responsibly eliminating adverse effects caused by change in voltages at the reset.

In the image pickup system, the selecting unit may extract one or more portions on the array and select unit cells in the portions as the correction targets. The portions are within areas in each of which unit cells having the read voltages judged as not being within the predetermined range are spatially contiguous. Each of the portions is composed of spatially contiguous unit cells that have the differential voltages being not a saturation voltage as well as has adjoining unit cells containing one or more unit cells that have the differential voltages being the saturation voltage.

In the signal processing apparatus, the selecting unit may extract one or more portions on the array and select unit cells in the portions as the correction targets. The portions are within areas in each of which unit cells having the read voltages judged as not being within the predetermined range are spatially contiguous. Each of the portions is composed of spatially contiguous unit cells that have the differential voltages being not a saturation voltage as well as has adjoining unit cells containing one or more unit cells that have the differential voltages being the saturation voltage.

In the signal processing method, the sub-step (d) may extract one or more portions on the array and select unit cells in the portions as the correction targets. The portions are within areas in each of which unit cells having the read voltages judged as not being within the predetermined range are spatially contiguous. Each of the portions is composed of spatially contiguous unit cells that have the differential voltages being not a saturation voltage as well as has adjoining unit cells containing one or more unit cells that have the differential voltages being the saturation voltage.

In the signal processing program, the sub-step (d) may extract one or more portions on the array and select unit cells in the portions as the correction targets. The portions are within areas in each of which unit cells having the read voltages judged as not being within the predetermined range are spatially contiguous. Each of the portions is composed of spatially contiguous unit cells that have the differential voltages being not a saturation voltage as well as has adjoining unit cells containing one or more unit cells that have the differential voltages being the saturation voltage.

Herewith, the above configurations allow to perform correction by selecting unit cells in candidate blocks for correction as correction targets only when differential voltages corresponding to unit cells adjoining the correction-candidate blocks are the saturation voltage.

In the image pickup system, the device output unit may include: a read voltage output unit operable to output read voltages generated by the plurality of unit cells to the signal processing apparatus; and a differential voltage output unit operable to output differential voltages generated by the differential voltage generating unit for the plurality of unit cells to the signal processing apparatus. The read voltage output unit and the differential voltage output unit are positioned symmetrically to each other with a center at the image pickup unit.

The above configuration reduces misalignment between an optical center and a chip center of the image pickup system.

In the image pickup system, the differential voltage generating unit may include: a first output line for outputting reset voltages and read voltages generated by the plurality of unit cells; a second output line for outputting the luminance information to the apparatus in the subsequent stage; a clamp capacity connected in series between the first and the second output line; a sampling capacity connected in series between the second output line and a predetermined voltage terminal; and a clamp transistor connected in series between the second output line and a reference voltage terminal. The image pickup unit transfers voltages retained in the clamp capacity as the read voltages to the device output unit via the first output line, and the differential voltage generating unit transfers voltages retained in the sampling capacity as differential voltages generated for the plurality of unit cells to the device output unit via the second output line.

The above configuration allows the image pickup system to retain the read voltages and differential voltages in separate capacities and transfer these voltages to the device output unit via separate output lines.

In the image pickup system, the image pickup unit may include: select transistors, each of which is connected in series between one of the plurality of unit cells and the first output line and used for selecting the unit cell; a load circuit operable to apply a load to the first output line, and used for reading the output voltage; and a loading transistor connected in series between the first output line and the load circuit. The image pickup system may further comprises: a control unit operable to retain the read voltages generated by the plurality of unit cells in the first output line by turning off the loading transistor to thereby cut off the load circuit in advance of setting the plurality of unit cells to a non-conducting state by turning off the select transistors.

Herewith, the load circuit is cut off before the read voltages are read out, and therefore the image pickup system is able to accomplish low electric power consumption.

In the image pickup system, the differential voltage generating unit may further include: a sampling transistor positioned between the first output line and the clamp capacity.

The device output unit may include: a read voltage output unit having an input terminal connected between the sampling transistor and the clamp capacity, operable to amplify the read voltages outputted by the differential voltage generating unit to output to the signal processing apparatus.

Herewith, a nondestructive readout is applied for reading out the read voltages, and therefore the read voltages can be read out in advance of the differential voltages.

Since the present invention requires conducting judgments and processing based on the read voltages in advance, the time required for the judgments and processing can be shortened by reading out the read voltages in advance of the differential voltages.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENT(S)

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

1. First Embodiment 1.1 Structure

Figure 1:
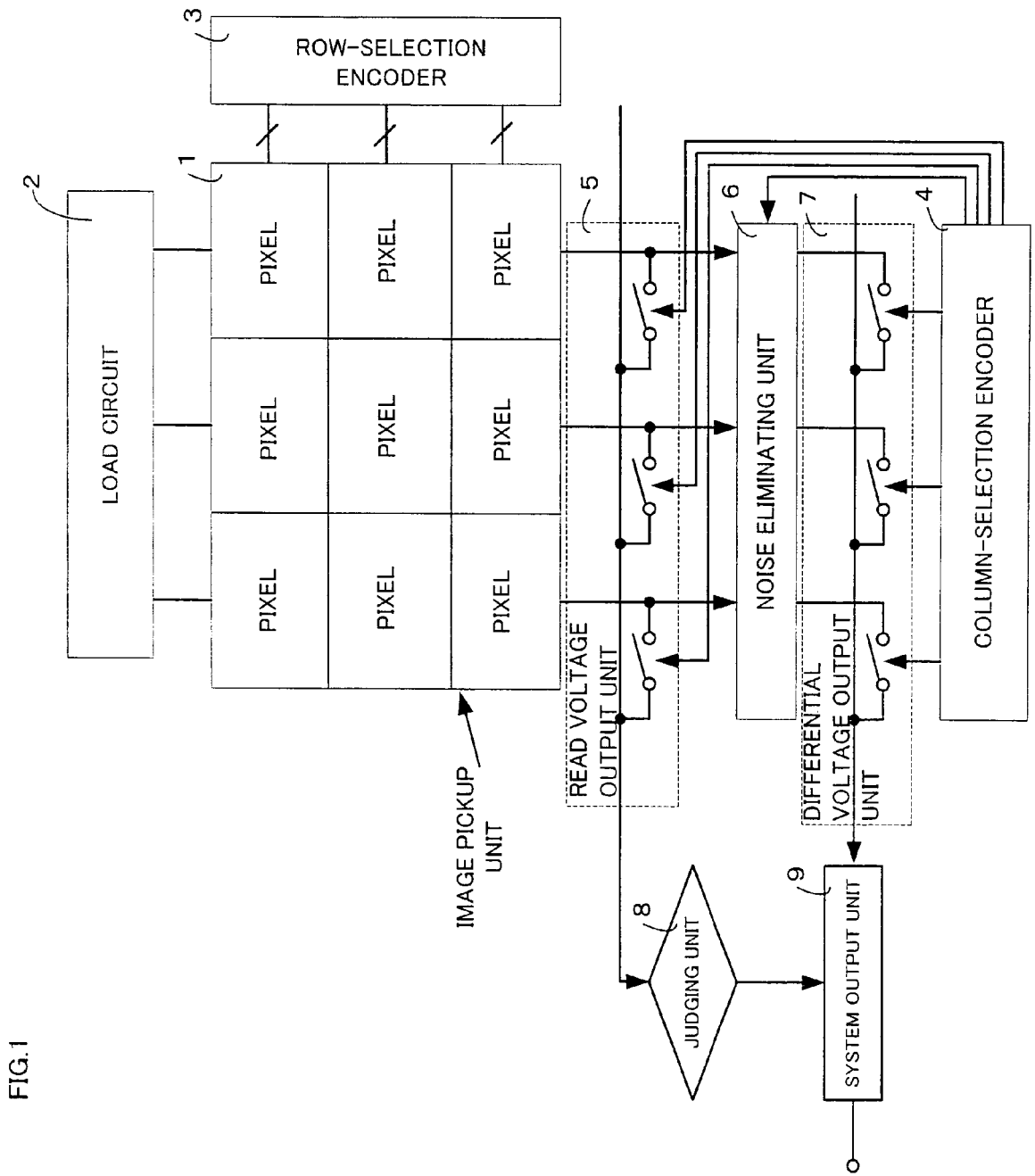
FIG. 1 shows a schematic structure of an image pickup apparatus according to a first embodiment of the present invention.

FIG. 1 shows a schematic structure of an image pickup apparatus according to a first embodiment of the present invention.

As shown in FIG. 1, the image pickup apparatus of the first embodiment comprises: an image pickup unit 1, a load circuit 2, a row-selection encoder 3, a column-selection encoder 4, a read voltage output unit 5, a noise eliminating unit 6, a differential voltage output unit 7, a judging unit 8, and a system output unit 9.

The image pickup unit 1 is an image pickup area in which a plurality of unit cells are arranged in a one- or two-dimensional array. Here, the structure of the first embodiment is described, using an example of the image pickup unit 1 composed of nine pixels arranged in a two-dimensional matrix of 3 rows by 3 columns. However, the actual number of pixels structuring the image pickup unit 1 is thousands in the case of a one-dimensional array, and hundreds of thousand to millions in the case of a two-dimensional array.

The load circuit 2, in which an identical circuit is provided and connected with each column of pixels, applies load to pixels of the image pickup unit 1 column by column in order to read out output voltages.

The row-selection encoder 3 has three control lines called "RESET", "READ", and "LSEL" with respect for each row of pixels, and conducts control of resetting (initialization), reading (readout), and line-selecting (row selection) on pixels of the image pickup unit 1 row by row.

The column-selection encoder 4 has control lines, sequentially selects the columns, and controls the read voltage output unit 5, noise eliminating unit 6, and differential voltage output unit 7.

The read voltage output unit 5 sequentially outputs read voltages columnwise from the image pickup unit 1 under the control of the column-selection encoder 4.

The noise eliminating unit 6, in which an identical circuit is provided and connected with each column of pixels, generates, with respect to each unit cell, a differential voltage that corresponds to a difference between a reset voltage and a read voltage under the control of the column-selection encoder 4.

The differential voltage output unit 7 sequentially outputs the differential voltages generated by the noise eliminating unit 6 under the control of the column-selection encoder 4.

The judging unit 8 judges whether each read voltage outputted from the read voltage output unit 5 is within a predetermined range.

The system output unit 9 outputs luminance information for each unit cell to an apparatus in the subsequent stage. Here, regarding each unit cell whose read voltage has been judged by the judging unit 8 as being within the predetermined range, from among the differential voltages outputted from the differential voltage output unit 7, a differential voltage corresponding to the unit cell is outputted as the luminance information of the corresponding unit cell. On the other hand, regarding each unit cell whose read voltage has been judged by the judging unit 8 as not being within the predetermined range, a predetermined voltage indicating high luminance is outputted as the luminance information of the unit cell.

Here, the image pickup unit 1, load circuit 2, row-selection encoder 3, column-selection encoder 4, read voltage output unit 5, noise eliminating unit 6, and differential voltage output unit 7 are implemented by a circuit of a semiconductor image pickup device. The judging unit 8 and system output unit 9 are implemented by a signal processing apparatus composed of a general purpose computer and specialized application programs.

Figure 2:
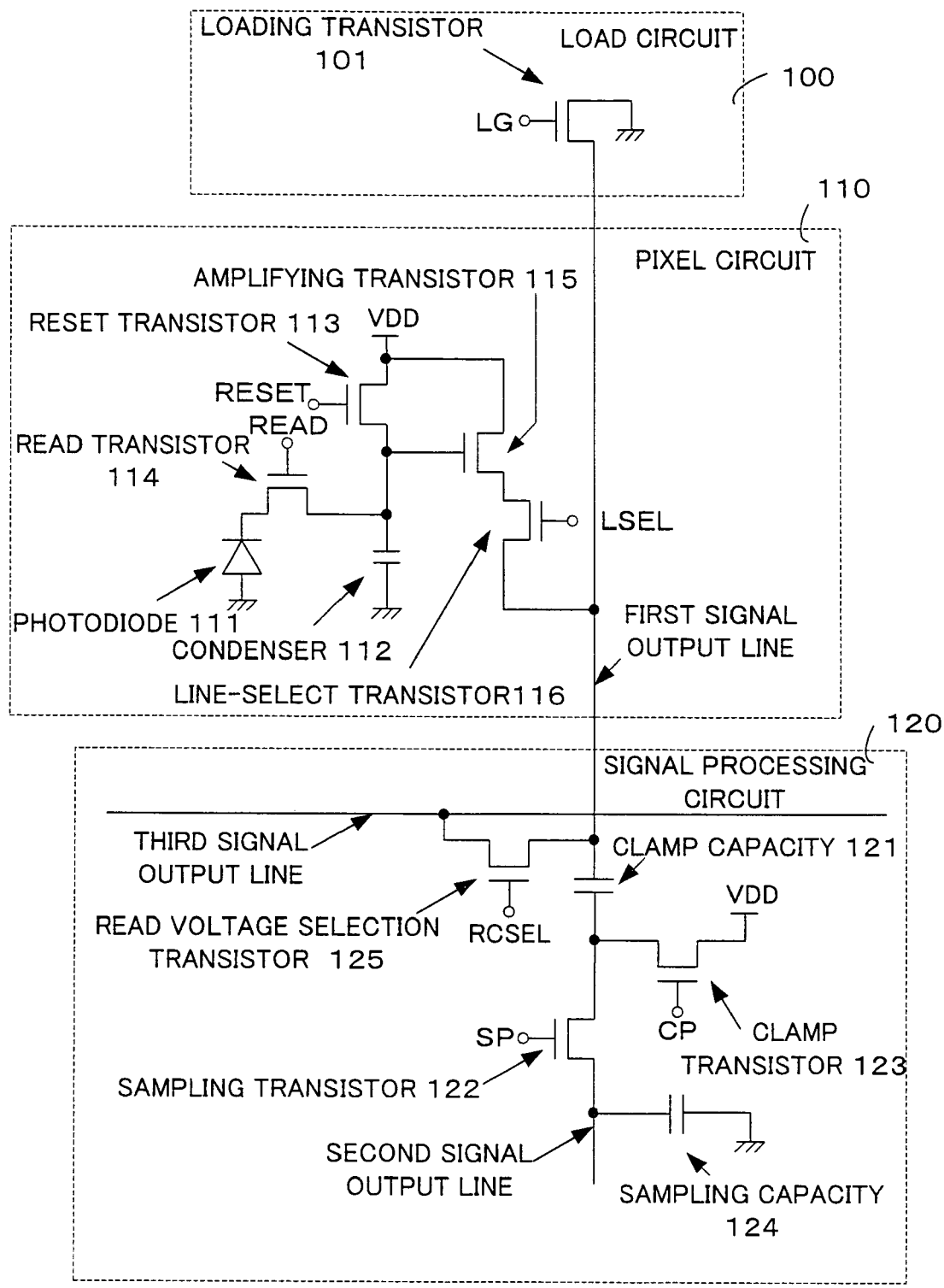
FIG. 2 is a schematic diagram showing a circuit of a semiconductor image pickup device according to the first embodiment.

FIG. 2 is a schematic diagram showing the circuit of a semiconductor image pickup device according to the first embodiment.

As shown in FIG. 2, the circuit of a semiconductor image pickup device of the first embodiment comprises a load circuit 100, a pixel circuit 110, and a signal processing circuit 120.

The load circuit 100, drawn as a representative example of one of the multiple circuits in the load circuit 2 shown in FIG. 1, includes a loading transistor 101 connected between a first signal output line and the ground. A load voltage (LG) is supplied to the load circuit 100.

The pixel circuit 110, drawn as a representative example of one of the unit cells in the image pickup unit 1 shown in FIG. 1, is characterized by outputting, to the first signal output line, a reset voltage obtained by amplifying a voltage of an initialization and a read voltage obtained by amplifying a voltage of a reading. The pixel circuit 110 includes: a photodiode 111 for performing photoelectric conversion on light incident thereto and outputting electric charge; a condenser 112 for storing electric charge and indicating a voltage corresponding to the stored electric charge; a reset transistor 113 for resetting the voltage indicated by the condenser 112 to an initial voltage (here, VDD); a read transistor 114 for supplying the electric charge outputted by the photodiode 111 to the condenser 112; an amplifying transistor 115 for outputting a voltage which changes so as to follow the voltage indicated by the condenser 112; and a line-select transistor 116 for outputting the output of the amplifying transistor 115 to the first signal output line when receiving a line-select signal from the row-selection encoder 3.

The signal processing circuit 120 is drawn as a representative example of one of the circuits each assigned to the respective columns of pixels within the read voltage output unit 5, noise eliminating unit 6, and differential voltage output unit 7. The signal processing circuit 120 is characterized by outputting, to a second signal output line, luminance information indicating a difference between the reset voltage and the read voltage outputted by a corresponding unit cell and outputting the reset voltage to a third signal output line. The signal processing circuit 120 includes: a clamp capacity 121 and a sampling transistor 122 that are connected in series with each other between the first and second signal output lines; a clamp transistor 123 connected in series between a reference voltage terminal (VDD) and a signal line which connects the clamp capacity 121 and sampling transistor 122; a sampling capacity 124 connected in series between the second signal output line and the ground; and a read voltage selection transistor 125 connected in series between the first and third signal output lines.

Here, control pulses supplied to the pixel circuit 110 respectively at predetermined timings are reset pulses (initialization signal: RESET), read pulses (readout pulses: READ), and line-select pulses (row selection signal: LSEL). On the other hand, control signals supplied to the signal processing circuit 120 respectively at predetermined timings are sampling pulses (SP), clamp pulses (CP), and read voltage selection pulses (RCSEL). Herewith, transistors corresponding to each type of these control pulses are opened and closed (off and on) accordingly.

Figure 3:
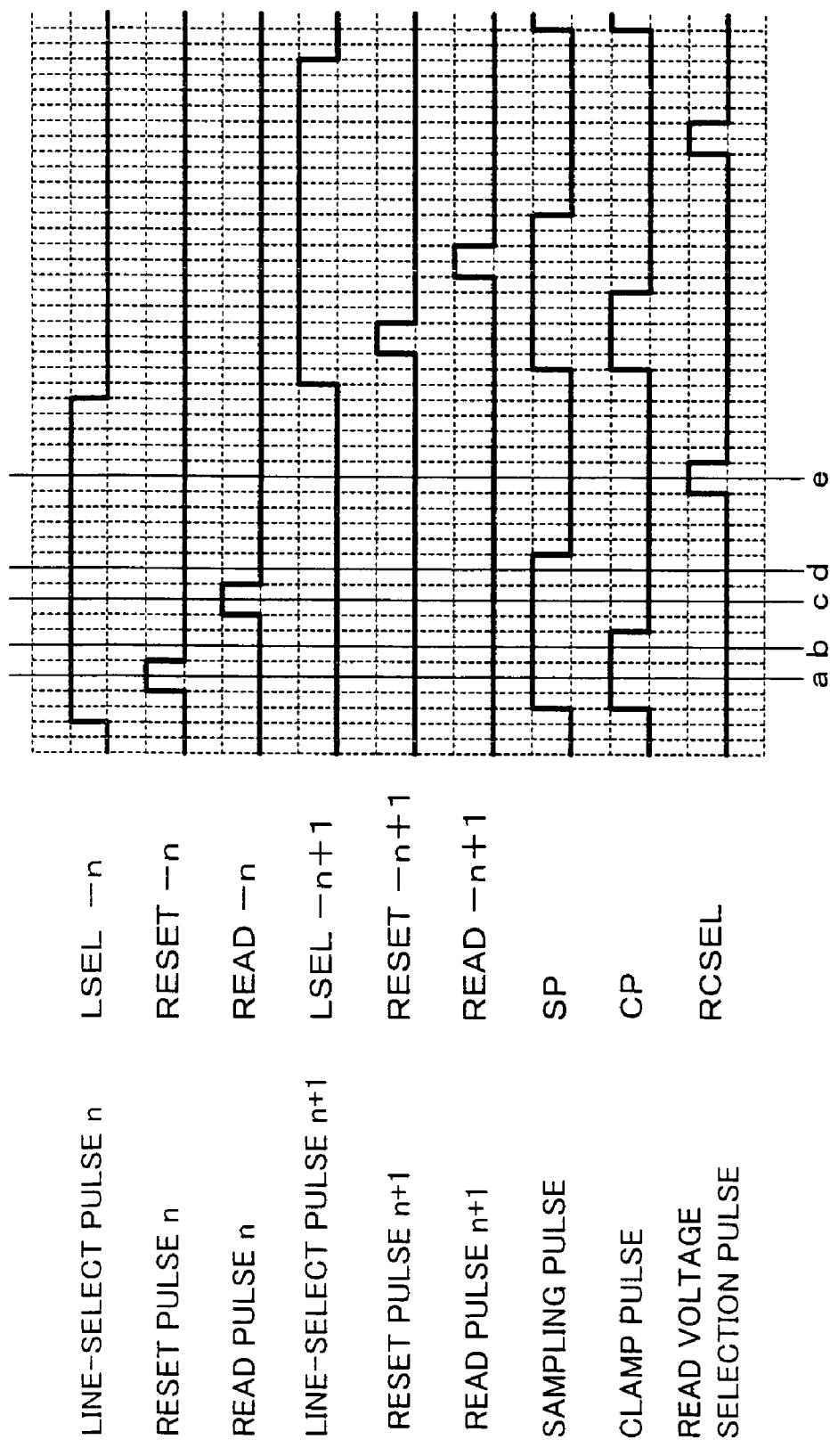
FIG. 3 shows an example of timings of respective types of control pulses in the image pickup apparatus of the first embodiment.

FIG. 3 shows an example of timings of the respective types of control pulses in the image pickup apparatus of the first embodiment.

Supplying the respective types of control pulses at timings shown in FIG. 3 allows the following series of procedures. The sampling and clamp transistors 122 and 123 are set as closed (set to the on-state) with the line-select transistor 116 also being closed (in the on-state). Thereby, the first signal output line is made to output the reset voltage with the second signal output line set to the reference voltage ("a" in FIG. 3). An amount equivalent to the difference between the reference voltage and the reset voltage is retained in the clamp capacity 121 ("b" in FIG. 3). Subsequently, the clamp transistor 123 is opened (set to the off-state) while the read transistor 114 is closed (set to the on-state), which thereby causes the first signal output line to output the read voltage ("c" in FIG. 3). A voltage of the second output line is changed by the amount equivalent to the difference between the reset and read voltages from the reference voltage ("d" in FIG. 3), and the equivalent is outputted as the luminance information. Then, after the sampling transistor 122 is opened (set to the off-state), the read voltage selection transistor 125 is closed (set to the on-state). Thereby, the third signal output line is made to output the read voltage ("e" in FIG. 3).

Figure 4:
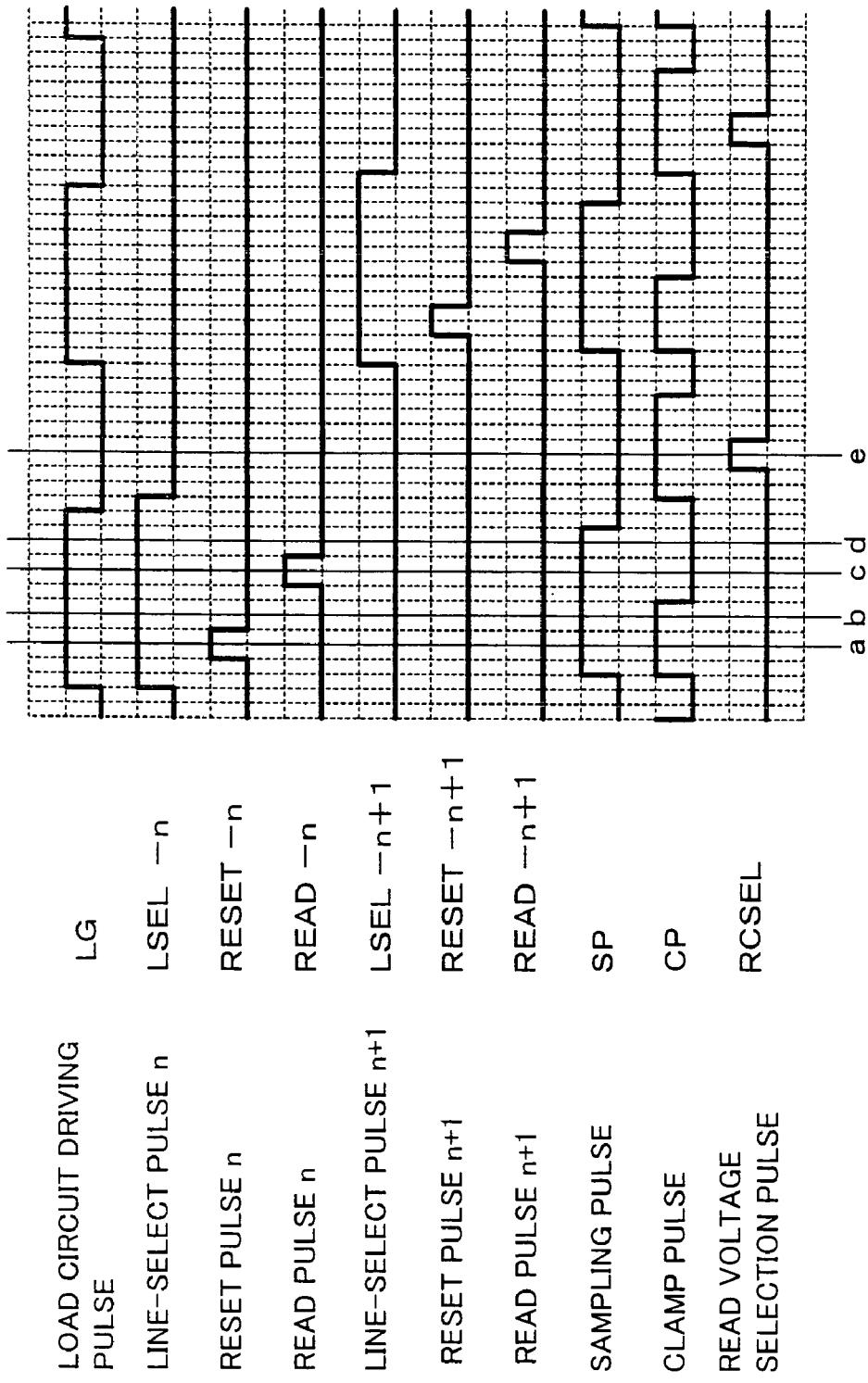
FIG. 4 shows another example of timings of respective types of control pulses in the image pickup apparatus of the first embodiment.

FIG. 4 shows another example of timings of the respective types of control pulses in the image pickup apparatus of the first embodiment.

While the loading transistor 101 is constantly closed (in the on-state) in the example shown in FIG. 3, the example of FIG. 4 realizes low electric power consumption by applying load circuit driving pulses to the loading transistor 101, storing the read voltage in the clamp capacity 121, and stopping the load circuit from driving before outputting the read voltage.

Supplying the respective types of control pulses at timings shown in FIG. 4 allows the following series of procedures. The loading transistor 101 is set as closed (set to the on-state), and then the sampling and clamp transistors 122 and 123 are set as closed (set to the on-state) with the line-select transistor 116 also being closed (in the on-state). Thereby, the first signal output line is made to output the reset voltage with the second signal output line set to the reference voltage ("a" in FIG. 4). An amount equivalent to the difference between the reference voltage and the reset voltage is retained in the clamp capacity 121 ("b" in FIG. 4). Subsequently, the clamp transistor 123 is opened (set to the off-state) and then the read transistor 114 is closed (set to the on-state), which thereby causes the first signal output line to output the read voltage ("c" in FIG. 4). A voltage of the second output line is changed by the amount equivalent to the difference between the reset and read voltages from the reference voltage ("d" in FIG. 4), and the equivalent is outputted as the luminance information. Then, the connection between the clamp capacity 121 and the sampling capacity 124 having the luminance information stored therein is cut off by opening the sampling transistor 122 (setting to the off-state). After the loading transistor 101 is opened (set to the off-state), the line-select transistor 116 is opened (set to the off-state), which thereby sets the first signal output line in a floating state. While the first signal output line remains in the state, the clamp transistor 123 is closed (set to the on-state). After a reference voltage is applied to the clamp capacity 121, the read voltage selection transistor 125 is closed (set to the on-state) Thereby, the third signal output line is made to output the read voltage ("e" in FIG. 4).

1.2 Operations

Figure 5:
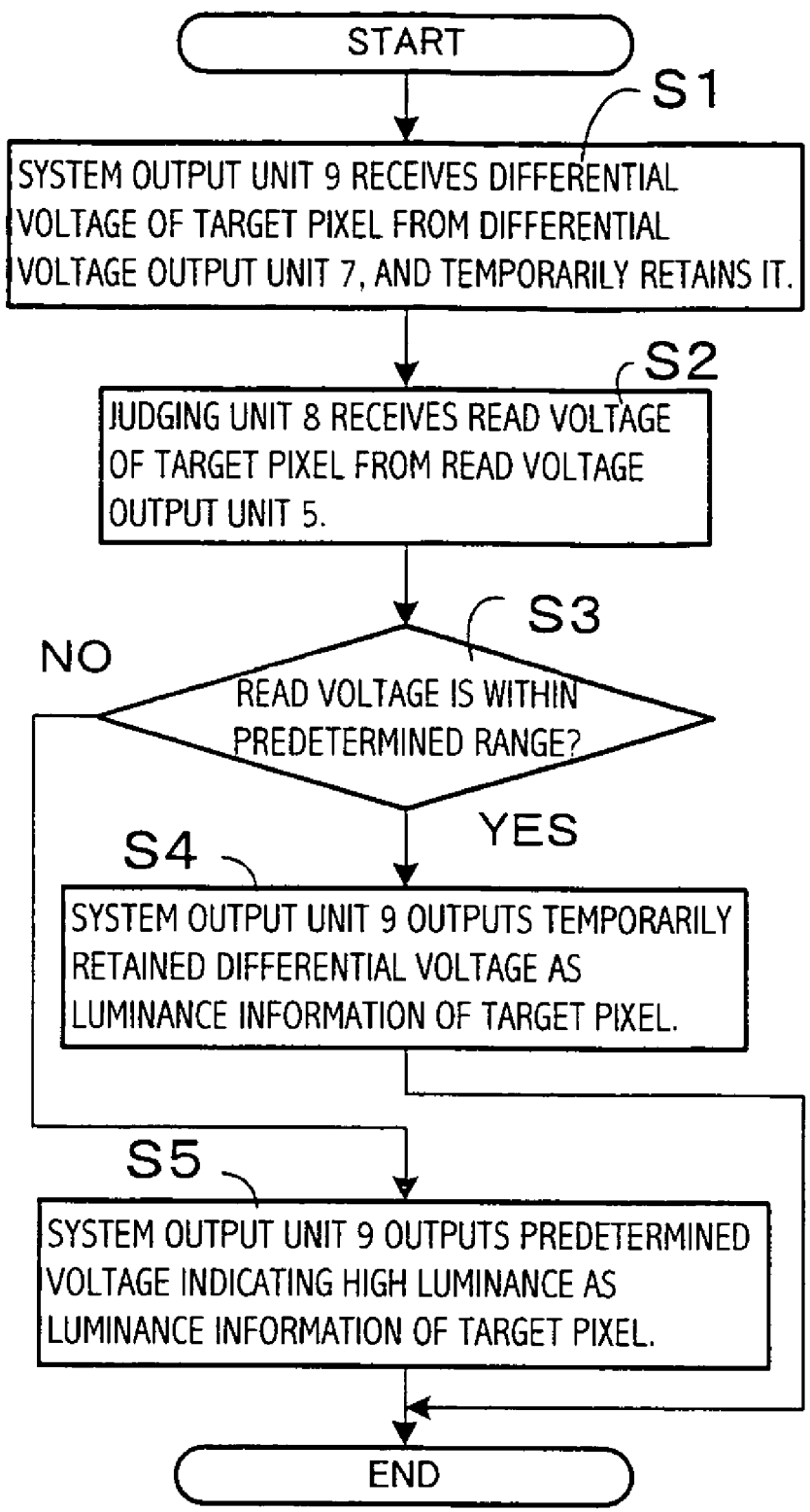
FIG. 5 shows a procedure of signal processing performed, for each pixel, by a judging unit 8 and a system output unit 9.

FIG. 5 shows a procedure of signal processing performed, for each pixel, by the judging unit 8 and the system output unit 9.

The following describes the signal processing with respect to each pixel with the aid of FIG. 5.

(1) The system output unit 9 receives a differential voltage of a target pixel from the differential voltage output unit 7 and temporarily retains it (Step S1).

(2) The judging unit 8 receives a read voltage of the target pixel from the read voltage output unit 5 (Step S2).

(3) The judging unit 8 judges whether the received read voltage is within a predetermined range (Step S3).

(4) When the read voltage is judged by the judging unit 8 as being within the predetermined range, the system output unit 9 outputs the temporarily retained differential voltage as luminance information of the target pixel (Step S4).

(5) When the read voltage is judged by the judging unit 8 as not being within the predetermined range, the system output unit 9 outputs a predetermined voltage indicating high luminance as luminance information of the target pixel (Step S5).

1.3 Summary

Figure 6:
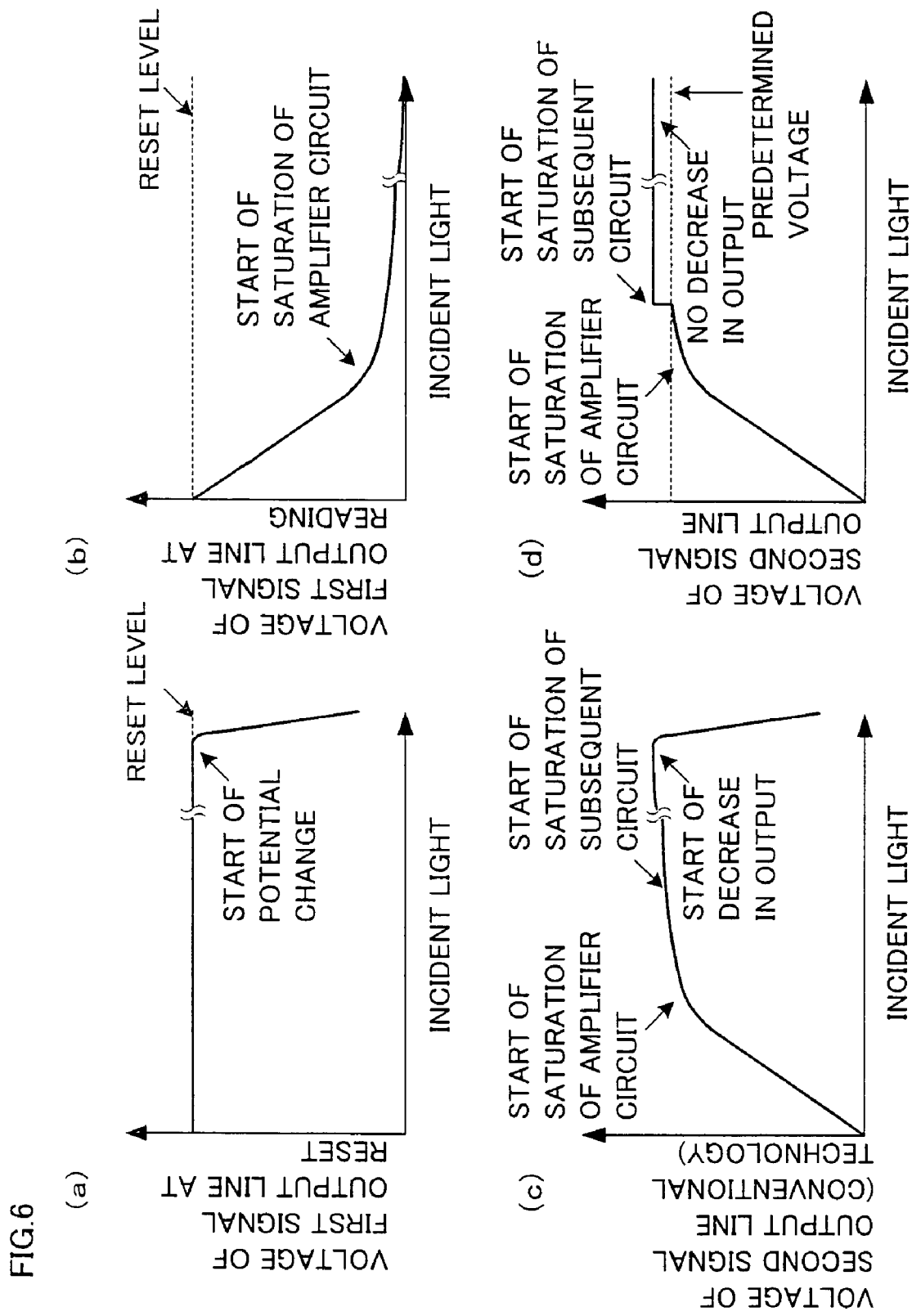
FIG. 6A shows a voltage characteristic of a first signal output line at a reset.
FIG. 6B shows a voltage characteristic of the first signal output line at a reading.
FIG. 6C shows an output voltage characteristic of a conventional image pickup apparatus with which no measures are provided for image darkening.
FIG. 6D shows an output voltage characteristic of the image pickup apparatus of the first embodiment according to the present invention.

FIG. 6A shows a voltage characteristic of the first signal output line at a reset.

FIG. 6B shows a voltage characteristic of the first signal output line at a reading.

FIG. 6C shows an output voltage characteristic of a conventional image pickup apparatus with which no measures are provided for image darkening. Note that FIG. 6C corresponds to "minus (FIG. 6A minus FIG. 6B)" (i.e. subtracting the voltage of the first signal output line at the reading from the voltage of the first signal output line at the reset, and applying a negative sign to the result).

FIG. 6D shows an output voltage characteristic of the image pickup apparatus of the first embodiment. When the read voltage exceeds the predetermined voltage, a voltage indicating high luminance is outputted instead, and therefore images are never subject to darkening.

In FIGS. 6A to 6D, the lateral axes are intensity of incident light (higher to right), and the vertical axes are voltage (plus (+), upwards in FIGS. 6A and 6B; minus (−), upwards in FIGS. 6C and 6D).

As described above, the first embodiment of the present invention focuses attention on the voltage at the reading shown in FIG. 6B, and replaces an output voltage having the potentiality of causing image darkening with a voltage indicating high luminance when judging the voltage at the reading has reached around a level at which the amplifier circuit is saturated. Thus, by adopting a sufficient measure of dealing with even incident light having a considerably lower intensity than incident light causing image darkening, the first embodiment is capable of resolving the problem of image darkening due to the entrance of intense light in a more reliable fashion than the conventional means, and responsibly eliminating adverse effects caused by change in voltages at the reset.

2. Second Embodiment

2.1 Structure

Figure 7:
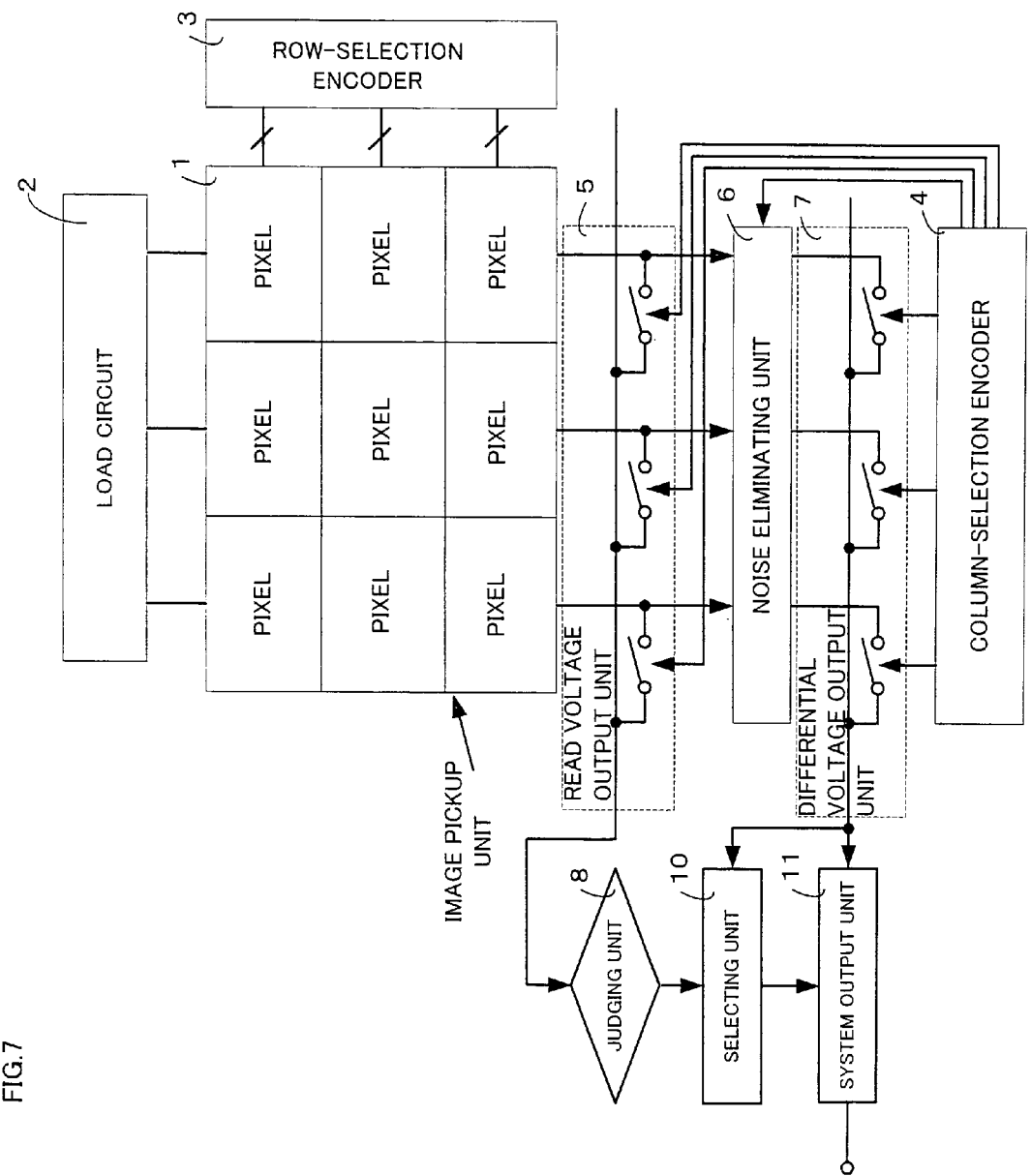
FIG. 7 shows a schematic structure of an image pickup apparatus according to a second embodiment of the present invention.

FIG. 7 shows a schematic structure of an image pickup apparatus according to a second embodiment of the present invention.

As shown in FIG. 7, the image pickup apparatus of the second embodiment comprises: an image pickup unit 1, a load circuit 2, a row-selection encoder 3, a column-selection encoder 4, a read voltage output unit 5, a noise eliminating unit 6, a differential voltage output unit 7, a judging unit 8, a selecting unit 10, and a system output unit 11.

Note that the same numbers are used for the same components as in the first embodiment, and their descriptions are omitted.

The selecting unit 10 selects, based on the differential voltages outputted from the differential voltage output unit 7, unit cells targeted for correction from among unit cells whose read voltages have been judged by the judging unit 8 as not being within the predetermined range.

Figure 8:
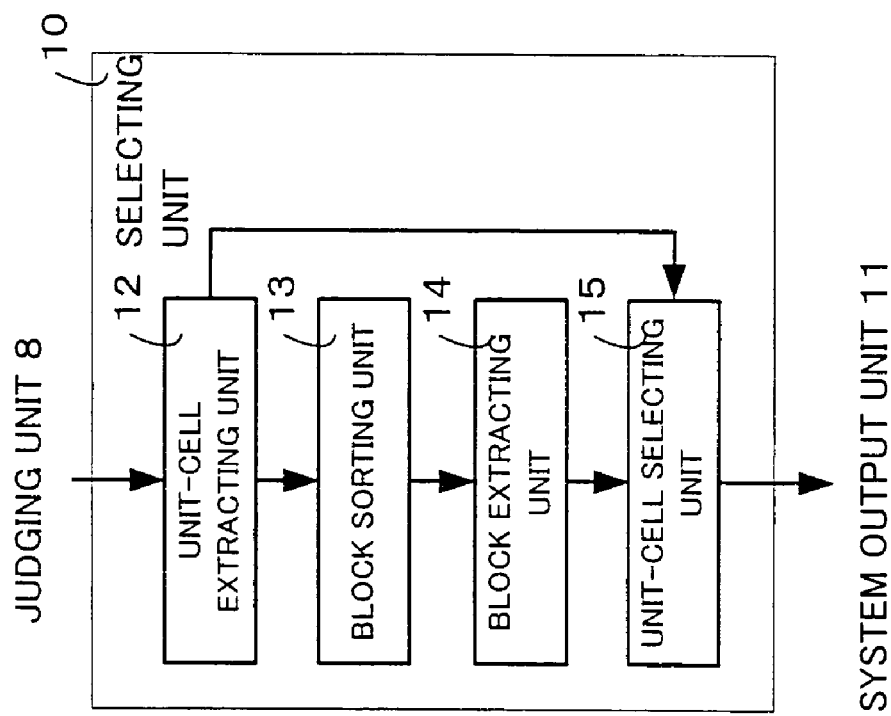
FIG. 8 shows a detailed structure of a selecting unit 10.

FIG. 8 shows a detailed structure of the selecting unit 10.

As shown in FIG. 8, the selecting unit 10 includes a unit-cell extracting unit 12, a block sorting unit 13, a block extracting unit 14, and a unit-cell selecting unit 15.

The unit-cell extracting unit 12 extracts, from among unit cells whose read voltages have been judged by the judging unit 8 as not being within the predetermined range, unit cells whose differential voltages are not a saturation voltage.

The block sorting unit 13 sorts the unit cells extracted by the unit-cell extracting unit 12 into blocks, each of which is composed of spatially contiguous pixels on the array.

The block extracting unit 14 extracts, from among the blocks sorted by the block sorting unit 13, blocks where all or part of unit cells adjoining to each of the blocks have differential voltages which are the saturation voltage.

The unit-cell selecting unit 15 selects unit cells in the blocks extracted by the block extracting unit 14 as correction targets.

The system output unit 11 outputs luminance information for each unit cell to an apparatus in the subsequent stage. Here, regarding each unit cell not selected by the unit-cell selecting unit 15 as a correction target, from among differential voltages outputted from the differential voltage output unit 7, a differential voltage corresponding to the unit cell is outputted as the luminance information for the unit cell. On the other hand, regarding each unit cell selected by the unit-cell selecting unit 15 as a correction target, a predetermined voltage indicating high luminance is outputted as the luminance information of the unit cell.

Here, the image pickup unit 1, load circuit 2, row-selection encoder 3, column-selection encoder 4, read voltage output unit 5, noise eliminating unit 6, and differential voltage output unit 7 are implemented by a circuit of a semiconductor image pickup device. The judging unit 8, selecting unit 10, and system output unit 11 are implemented by a signal processing apparatus composed of a general purpose computer and specialized application programs.

2.2 Operations

Figure 9:
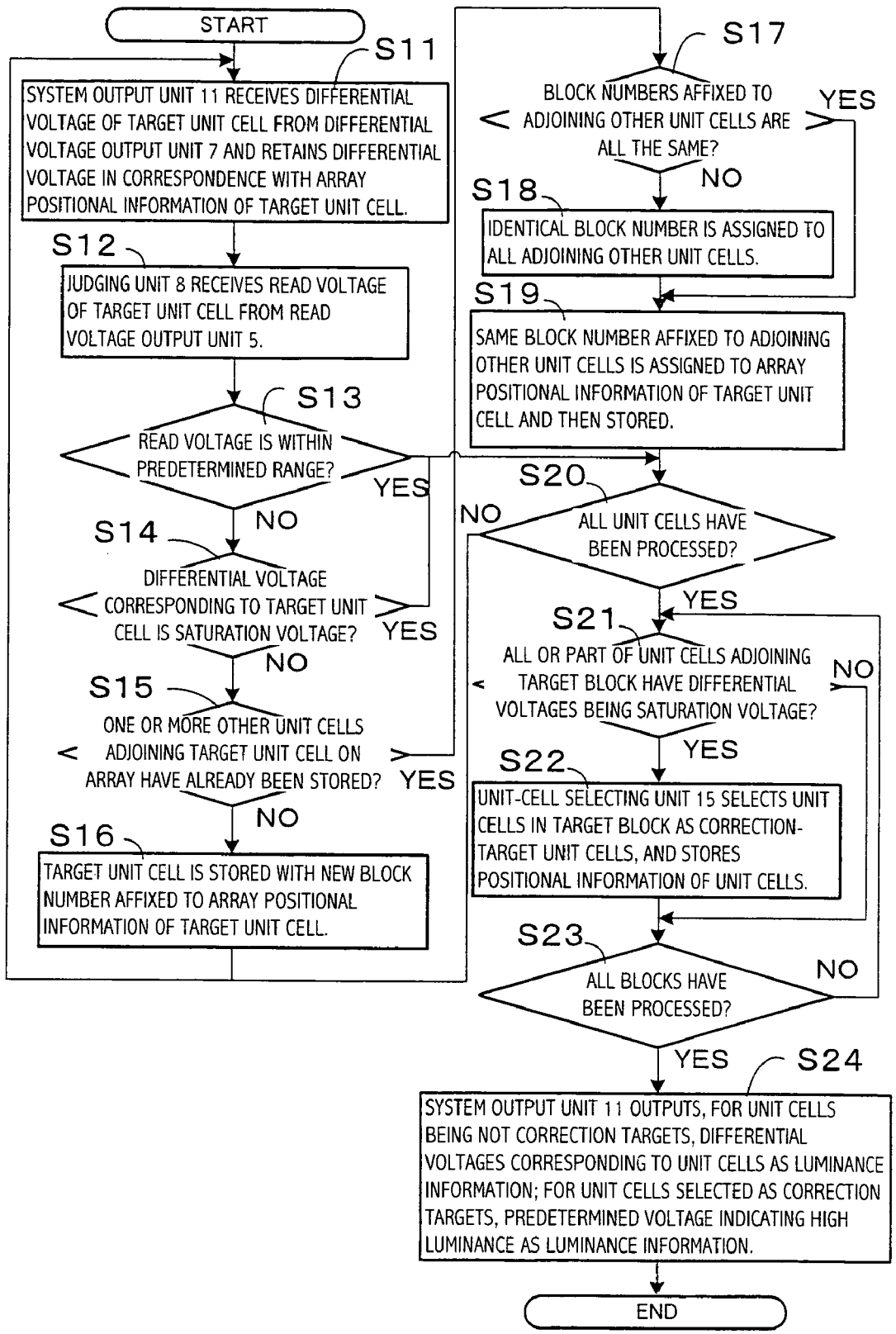
FIG. 9 shows a procedure of signal processing conducted by a judging unit 8, a selecting unit 10, and a system output unit 11.

FIG. 9 shows a procedure of signal processing conducted by the judging unit 8, the selecting unit 10, and the system output unit 11.

The following describes the procedure of signal processing with the aid of FIG. 9.

(1) The system output unit 11 receives a differential voltage of a target unit cell from the differential voltage output unit 7 and retains the differential voltage in correspondence with positional information of the target unit cell on the array (Step S11).

(2) The judging unit 8 receives a read voltage of the target unit cell from the read voltage output unit 5 (Step S12).

(3) The judging unit 8 judges whether the received read voltage is within a predetermined range (Step S13). When the read voltage is judged as being within the predetermined range, no block number is affixed to the positional information of the target unit cell.

(4) When the read voltage is judged by the judging unit 8 as not being within the predetermined range, the unit-cell extracting unit 12 judges whether a differential voltage corresponding to the target unit cell is the saturation voltage (Step S14).

(5) When the corresponding differential voltage is judged as not being the saturation voltage, the block sorting unit 13 judges whether one or more unit cells adjoining the target unit cell on the array have already been stored by comparing the positional information of the target unit cell and that of all other unit cells on the array which have already been stored (Step S15).

(6) When no other unit cell adjoining the target unit cell has been stored, the target unit cell is stored with a new block number affixed to the positional information of the target unit cell (Step S16).

(7) When one or more unit cells adjoining the target unit cell have been stored, the block sorting unit 13 judges whether block numbers affixed to these unit cells are all the same (Step S17).

(8) When the block numbers are not all the same, the block sorting unit 13 newly assigns an identical block number to all (Step S18).

(9) The block sorting unit 13 assigns the same block number affixed to the adjoining unit cells to the positional information of the target unit cell, and stores the result (Step S19).

(10) The above processing is repeated for all unit cells (Step S20).

(11) The block extracting unit 14 judges whether differential voltages of all or part of unit cells adjoining a target block include the saturation voltage (Step S21).

Here is described one example of how to decide which unit cell to be used as an object for the judgment in the case when not all but only part of unit cells adjoining the target block are used for the judgment. The array of unit cells is here described in X-Y coordinates, (X, Y). An X-coordinate of the unit cell used for the judgment is, for example, "a center value or a mean value of X coordinates of all unit cells in the target block". A Y-coordinate of the unit cell for the judgment is, from among unit cells having this X-coordinate in the target block, "a maximum Y coordinate+1" or "a minimum Y coordinate−1".

(12) When the differential voltages are judged as being the saturation voltage, the unit-cell selecting unit 15 selects unit cells in the target block as correction targets, and stores positional information of these unit cells (Step S22).

(13) The above processing is repeated for all blocks (Step S23).

(14) The system output unit 11 outputs luminance information for each unit cell to an apparatus in the subsequent stage. Here, regarding each unit cell not selected by the unit-cell selecting unit 15 as a correction target, from among differential voltages outputted from the differential voltage output unit 7, a differential voltage corresponding to the unit cell is outputted as the luminance information for the unit cell. On the other hand, regarding each unit cell selected by the unit-cell selecting unit 15 as a correction target, a predetermined voltage indicating high luminance is outputted as the luminance information of the unit cell (Step S24).

2.3 Summary

As described above, the second embodiment of the present invention focuses attention on the voltage at the reading shown in FIG. 6B, as in the first embodiment, and replaces each of the output voltages in blocks assumed to be causing image darkening with a voltage indicating high luminance by judging whether the voltage at the reading has reached around a level at which the amplifier circuit is saturated as well as taking into account differential voltages. Thus, by adopting a sufficient measure of dealing with even for incident light having a considerably lower intensity than incident light causing image darkening, the second embodiment is capable of resolving the problem of image darkening due to the entrance of intense light in a more reliable fashion than the conventional means, and responsibly eliminating adverse effects caused by change in voltage at a reset.

3. First Modification

In semiconductor image pickup devices such as CMOS sensors, the noise eliminating unit is generally provided on one side of the image pickup unit, and therefore the optical center is out of alignment with the chip center.

As compared to a conventional semiconductor image pickup device, switching devices such as transistors, capacity devices such as condensers, amplifier circuits and the like are added on to the semiconductor image pickup device of the present invention in order to output read voltages.

Given this factor, a first modification of the present invention involves reducing the misalignment between the optical center and chip center by positioning symmetrically the additional components used for the read voltage output to the differential voltage output unit with a center at the image pickup unit.

3.1 Structure

Figure 10:
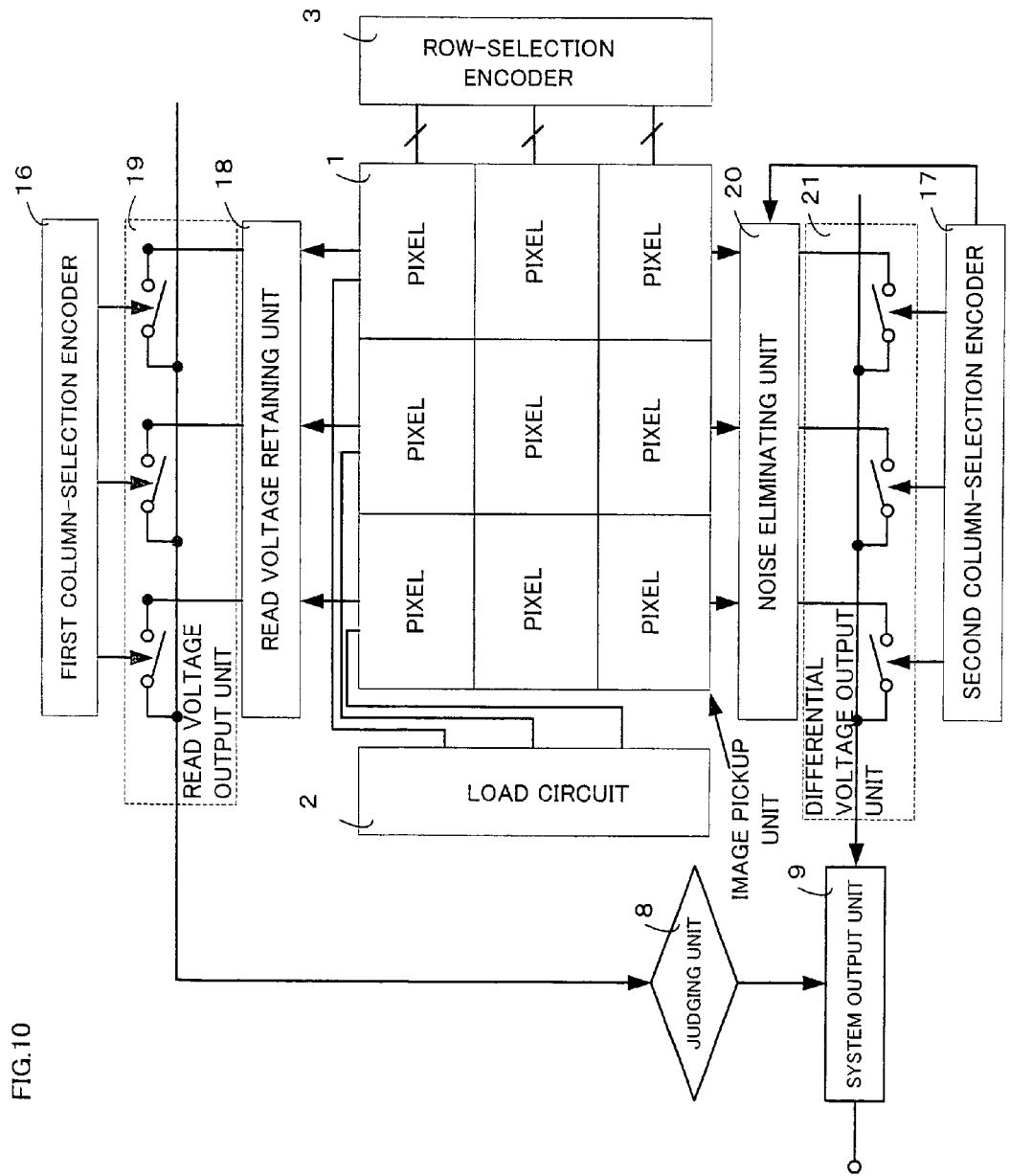
FIG. 10 shows a schematic structure of an image pickup apparatus according to a first modification of the present invention.

FIG. 10 shows a schematic structure of an image pickup apparatus according to the first modification of the present invention.

As shown in FIG. 10, the image pickup apparatus of the first modification comprises: an image pickup unit 1, a load circuit 2, a row-selection encoder 3, a first column-selection encoder 16, a second column-selection encoder 17, a read voltage retaining unit 18, a read voltage output unit 19, a noise eliminating unit 20, a differential voltage output unit 21, a judging unit 8, and a system output unit 9.

Note that the same numbers are used for the same components as in the first embodiment, and their descriptions are omitted.

The first column-selection encoder 16 has control lines, sequentially selects the columns, and controls the read voltage retaining unit 18 and read voltage output unit 19. The first column-selection encoder 16 is positioned symmetrically to the second column-selection encoder 17 with a center at the image pickup unit 1.

The second column-selection encoder 17 has control lines, sequentially selects the columns, and controls the noise eliminating unit 20 and differential voltage output unit 21. The second column-selection encoder 17 is positioned symmetrically to the first column-selection encoder 16 with a center at the image pickup unit 1.

The read voltage retaining unit 18 sequentially stores read voltages from the image pickup unit 1 under the control of the first column-selection encoder 16, and outputs the read voltages as they are, or amplifies these read voltages before outputting. The read voltage retaining unit 18 is positioned symmetrically to the noise eliminating unit 20 with a center at the image pickup unit 1.

The read voltage output unit 19 sequentially outputs the read voltages retained by the read voltage retaining unit 18 under the control of the first column-selection encoder 16. The read voltage output unit 19 is positioned symmetrically to the differential voltage output unit 21 with a center at the image pickup unit 1.

The noise eliminating unit 20, in which an identical circuit is provided and connected with each column of pixels, generates, with respect to each unit cell, a differential voltage that corresponds to a difference between a reset voltage and a read voltage under the control of the second column-selection encoder 17. The noise eliminating unit 20 is positioned symmetrically to the read voltage retaining unit 18 with a center at the image pickup unit 1.

The differential voltage output unit 21 sequentially outputs the differential voltages generated by the noise eliminating unit 20 under the control of the second column-selection encoder 17. The differential voltage output unit 21 is positioned symmetrically to the read voltage output unit 19 with a center at the image pickup unit 1.

FIG. 10 is a modification of the first embodiment, and a similar modification for the second embodiment is also described below.

Figure 11:
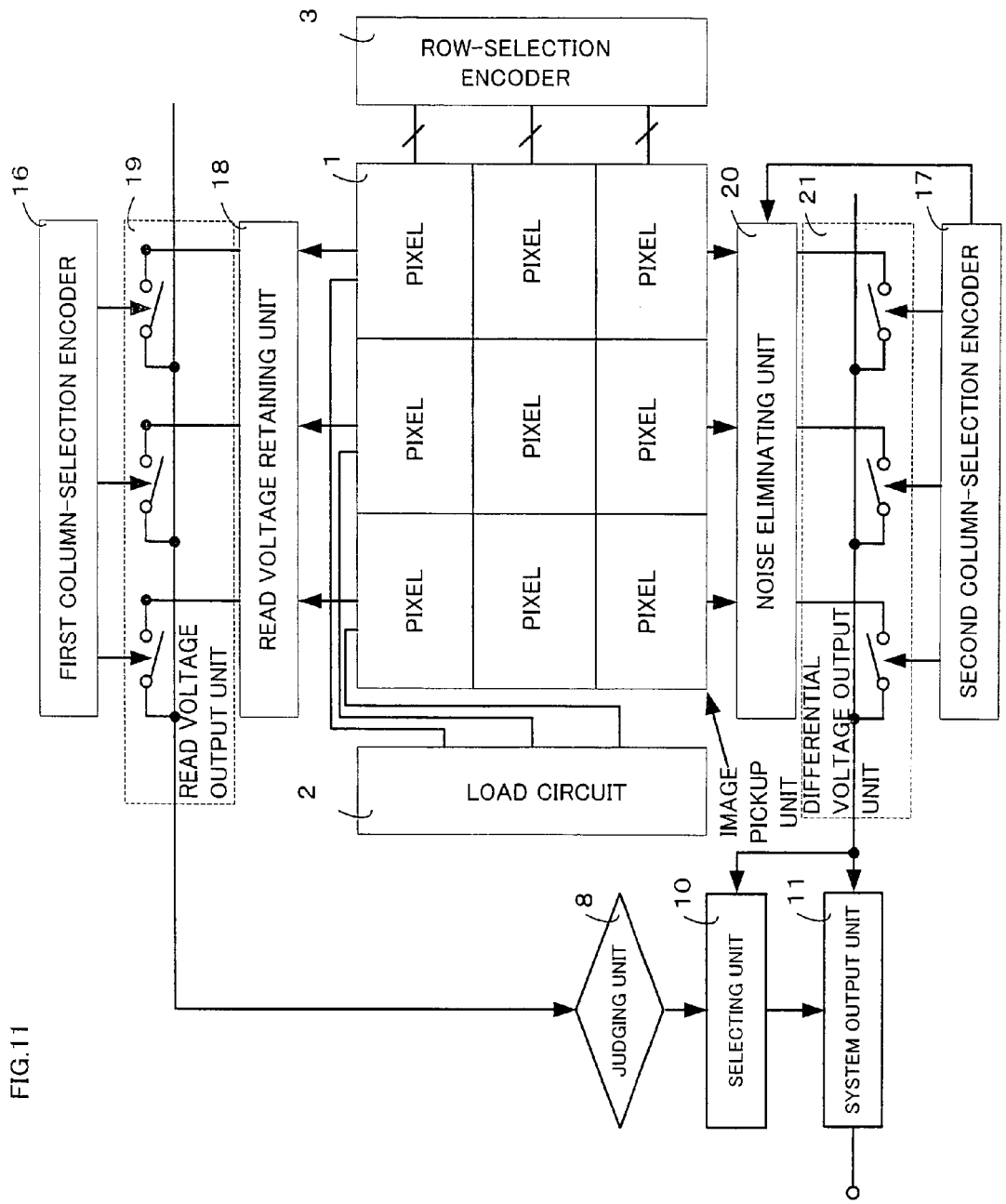
FIG. 11 is a schematic structure of another image pickup apparatus according to the first modification of the present invention.

FIG. 11 is a schematic structure of another image pickup apparatus according to the first modification of the present invention.

As shown in the FIG. 11, the image pickup apparatus of the first modification comprises: an image pickup unit 1, a load circuit 2, a row-selection encoder 3, a first column-selection encoder 16, a second column-selection encoder 17, a read voltage retaining unit 18, a read voltage output unit 19, a noise eliminating unit 20, a differential voltage output unit 21, a judging unit 8, a selecting unit 10, and a system output unit 11.

Note that the same numbers are used for the same components as in the second embodiment, and their descriptions are omitted.

3.2 Summary

As described above, the first modification of the present invention has the additional components used for the read voltage output positioned symmetrically to the differential voltage output unit with a center at the image pickup unit, and therefore achieves to reduce the misalignment between the optical center and chip center.

4. Second Modification

4.1 Structure

Figure 12:
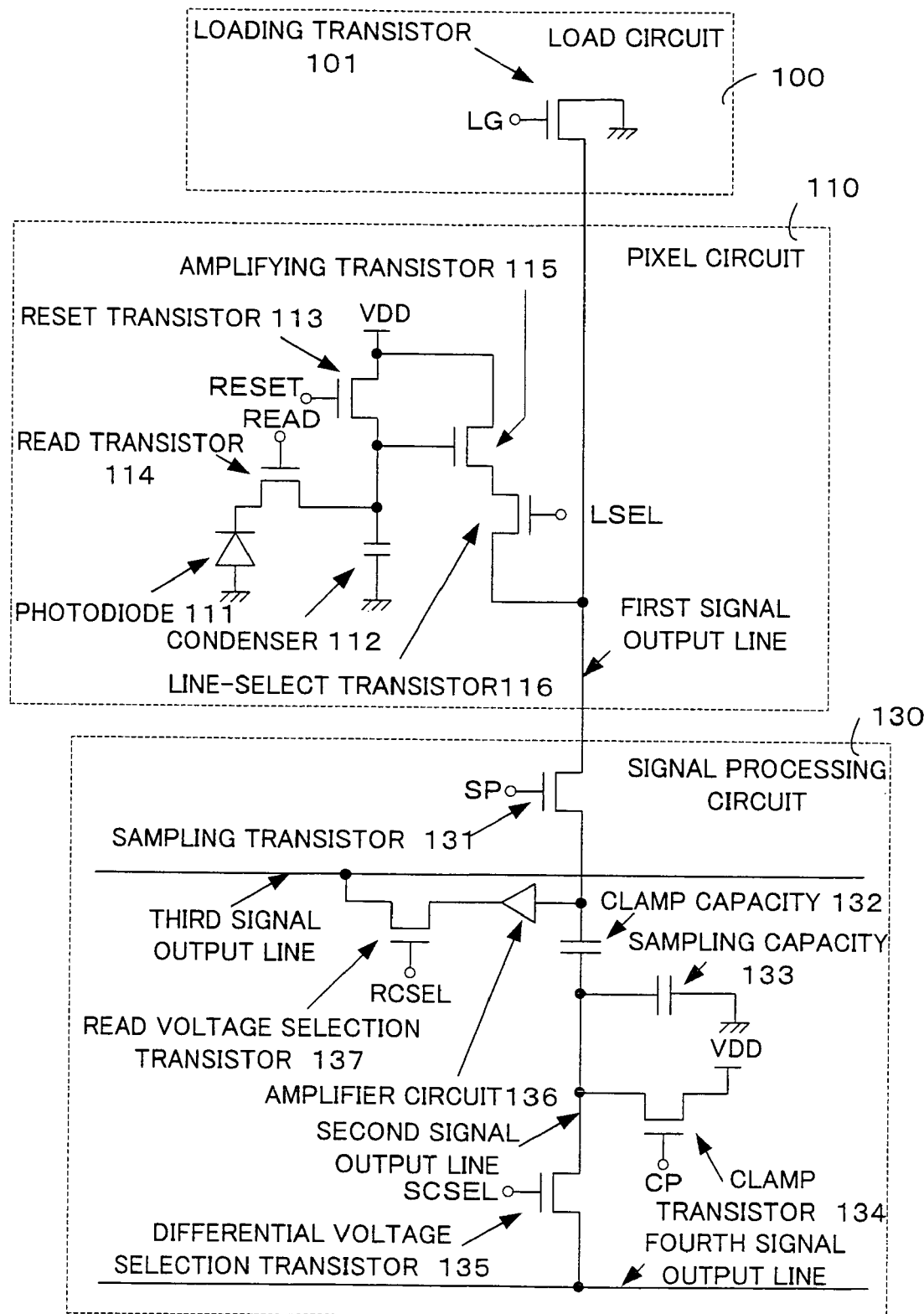
FIG. 12 is a schematic diagram showing a circuit of a semiconductor image pickup device according to the second modification.

FIG. 12 is a schematic diagram showing a circuit of a semiconductor image pickup device according to a second modification.

As shown in FIG. 12, the circuit of a semiconductor image pickup device of the second modification comprises a load circuit 100, a pixel circuit 110, and a signal processing circuit 130.

Note that the same numbers are used for the same components as in the first embodiment, and their descriptions are omitted.

The signal processing circuit 130 is drawn as a representative example of one of the circuits each assigned for the respective columns of pixels within the read voltage output unit 5, noise eliminating unit 6, and differential voltage output unit 7. The signal processing circuit 130 is characterized by outputting, to a fourth signal output line, luminance information indicating a difference between the reset voltage and the read voltage outputted by each of the unit cells, and outputting the reset voltage to a third signal output line. The signal processing circuit 130 includes: a sampling transistor 131 and a clamp capacity 132 that are connected in series with each other between the first and second signal output lines; a sampling capacity 133 connected in series between the second signal output line and the ground; a clamp transistor 134 connected in series between the second signal output line and a reference voltage terminal (VDD), a differential voltage selection transistor 135 connected in series between the second and fourth signal output lines, an amplifier circuit 136 whose input is provided through a signal line connecting the sampling transistor 131 and clamp capacity 132; and a read voltage selection transistor 137 connected in series between the output of the amplifier circuit 136 and the third signal output line.

Here, control pulses supplied to the pixel circuit 110 respectively at predetermined timings are reset pulses (initialization signal: RESET), read pulses (readout pulses: READ), and line-select pulses (row selection signal: LSEL). On the other hand, control signals supplied to the signal processing circuit 130 respectively at predetermined timings are sampling pulses (SP), clamp pulses (CP), differential voltage selection pulses (SCSEL), and read voltage selection pulses (RCSEL). Herewith, transistors corresponding to each type of these control pulses are opened and closed (off and on) accordingly.

Figure 13:
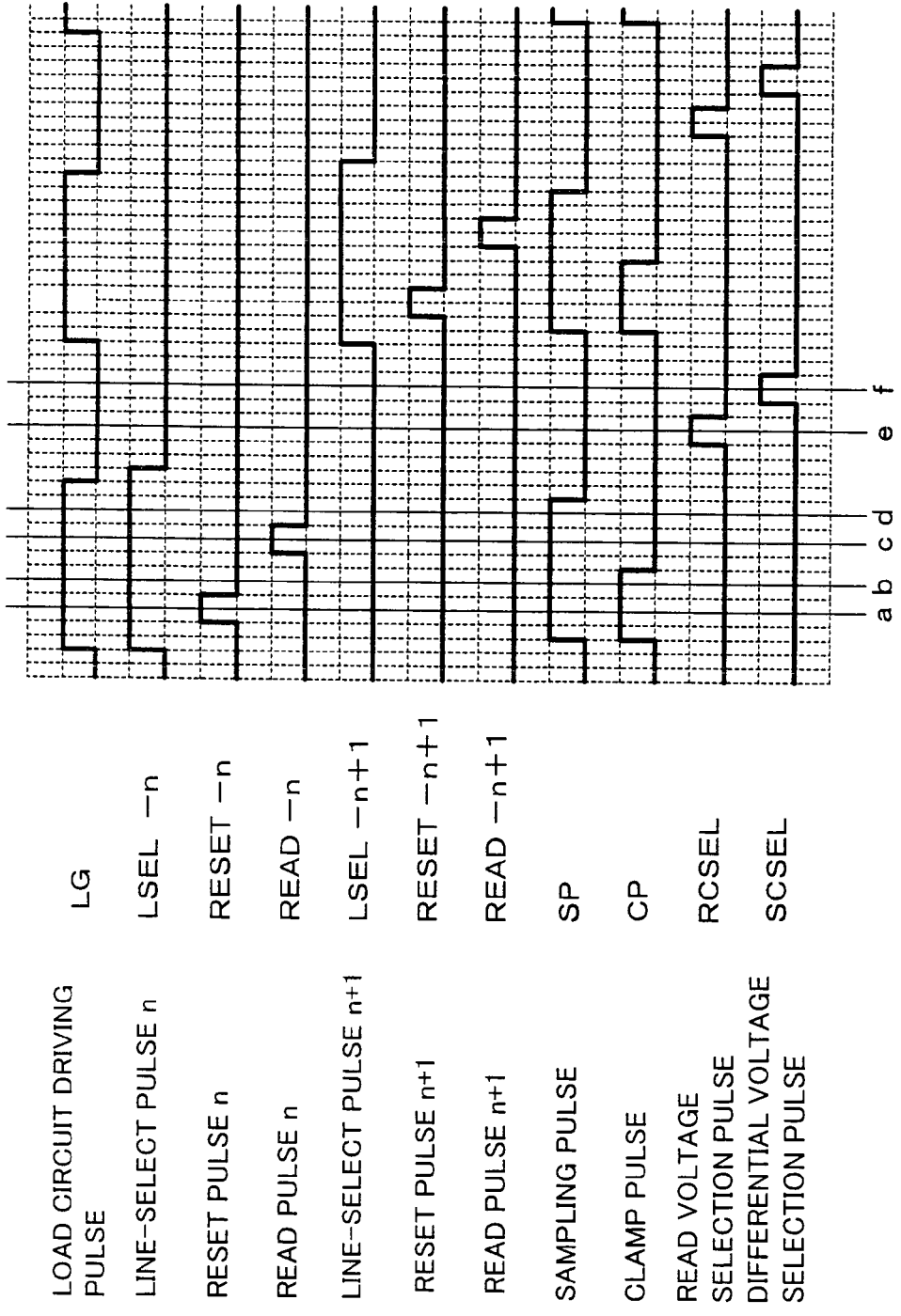
FIG. 13 shows an example of timings of respective control pulses in the image pickup apparatus of the second modification.

FIG. 13 shows an example of timings of the respective types of control pulses in the image pickup apparatus of the second modification.

Supplying the respective types of control pulses at timings shown in FIG. 13 allows the following series of procedures. The loading transistor 101 is set as closed (set to the on-state), and then the sampling transistor and clamp transistors 131 and 134 are set as closed (set to the on-state) with the line-select transistor 116 also being closed (in the on-state). Thereby, the first signal output line is made to output the reset voltage with the second signal output line set to the reference voltage ("a" in FIG. 13). An amount equivalent to the difference between the reference voltage and the reset voltage is retained in the clamp capacity 132 ("b" in FIG. 13). Subsequently, the clamp transistor 134 is opened (set to the off-state) and then the read transistor 114 is closed (set to the on-state), which thereby causes the first signal output line to output the read voltage ("c" in FIG. 13). A voltage of the second output line is changed by the amount equivalent to the difference between the reset and read voltages from the reference voltage ("d" in FIG. 13). Then, the connection between the first signal output line and the clamp capacity 132 is cut off by opening the sampling transistor 131 (setting to the off-state). After that, the loading transistor 101 and line-select transistor 116 are opened (set to the off-state) in order to lower the electric power consumption, and the read voltage selection transistor 137 is opened (set to the off-state). Thereby, the third signal output line is made to output the read voltage ("e" in FIG. 13). Then, the fourth signal output line is made to output the differential voltage by opening (set to the off-state) the differential voltage selection transistor 135 ("f" in FIG. 13).

Note that, because of the amplifier circuit 136 being provided, the read voltage outputted to the third signal output line is not destructed when being read out. Thus, the differential voltage does not change even if the read voltage is read out, and therefore, the read voltage can be read out in advance of the differential voltage.

4.2 Summary

As described above, the second modification of the present invention is capable of reading the read voltages in advance of the differential voltages.

Since the above embodiments of the present invention require conducting judgments and processing based on the read voltages in advance, the time required for the judgments and processing can be shortened by reading out the read voltages in advance of the differential voltages.

5. Third Modification 5.1 Structure

Figure 14:
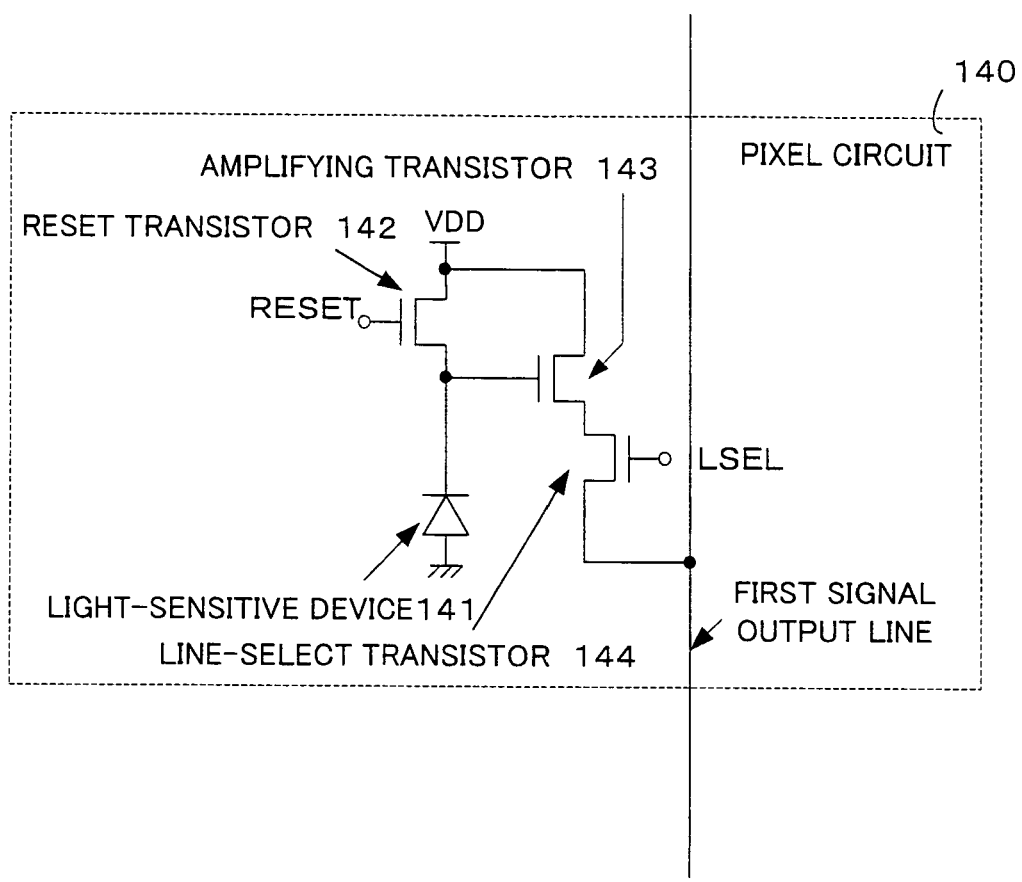
FIG. 14 shows a modified example of a pixel circuit.

FIG. 14 shows a modified example of the pixel circuit.

In the third modification of the present invention, the pixel circuit 110 of the first embodiment shown in FIG. 2 is replaced with a pixel circuit 140 shown in FIG. 14.

The pixel circuit 140 shown in FIG. 14 is characterized by outputting, to the first signal output line, a reset voltage obtained by amplifying a voltage of an initialization and a read voltage obtained by amplifying a voltage of a reading. The pixel circuit 140 includes: a light-sensitive device 141, such as a photodiode, for performing photoelectric conversion on light incident thereto to generate electric charge, storing the electric charge, and outputting the stored electric charge as a voltage signal; a reset transistor 142 for flushing the electric charge stored in the light-sensitive device 141 and resetting the voltage of the light-sensitive device 141 to an initial voltage (here, VDD); an amplifying transistor 143 for outputting a voltage which changes so as to follow the voltage generated according to the amount of electric charge stored in the light-sensitive device 141; and a line-select transistor 144 for outputting the output of the amplifying transistor 143 to the first signal output line when receiving a line-select signal from the row-selection encoder 3.

Figure 15:
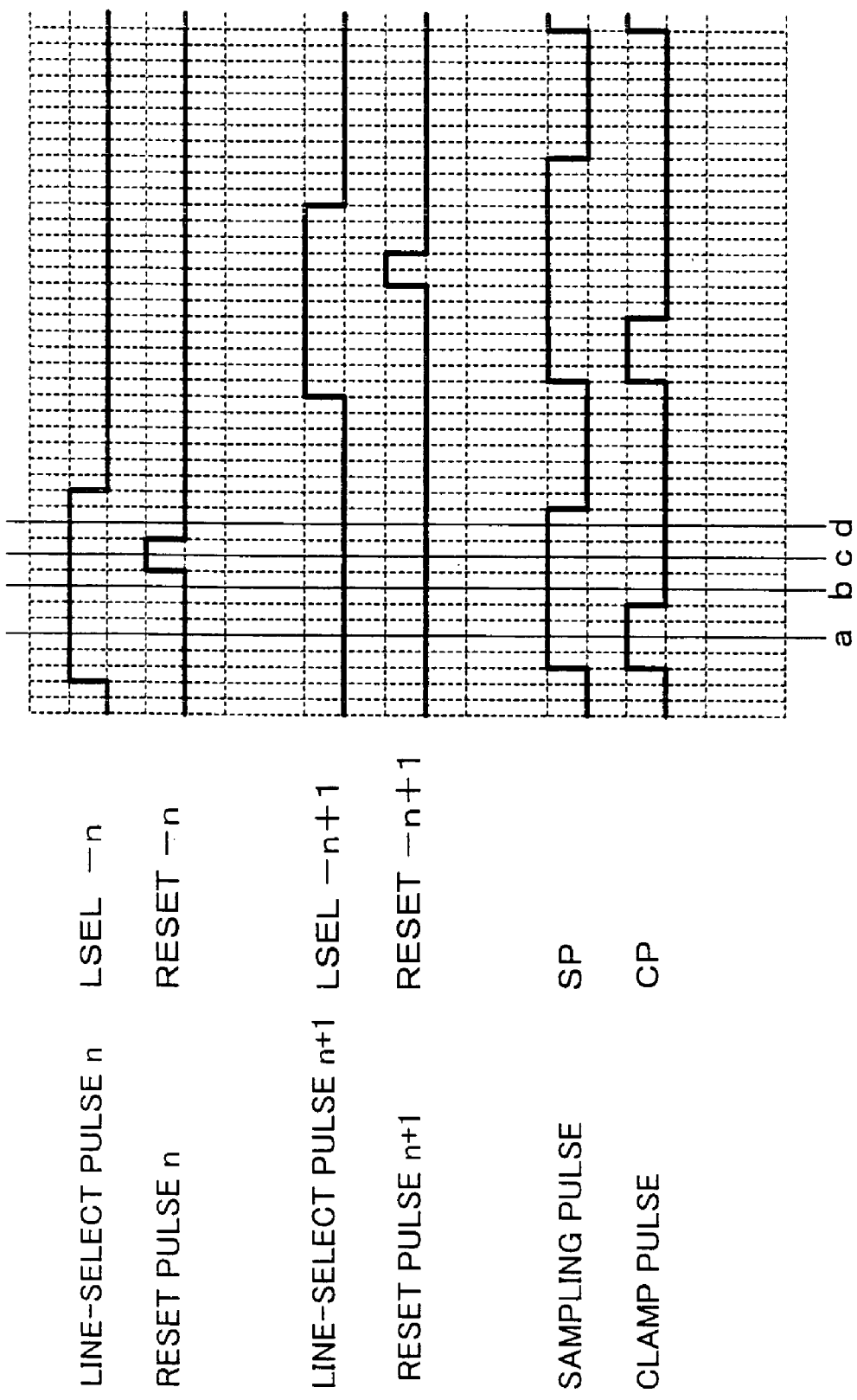
FIG. 15 shows an example of timings of respective control pulses in an image pickup apparatus of a third modification.

FIG. 15 shows an example of timings of respective control pulses in an image pickup apparatus of the third modification.

Supplying the respective types of control pulses at timings shown in FIG. 15 allows the following series of procedures. While the line-select transistor 144 is being closed (in the on-state), the first signal output line is made to output the read voltage corresponding to the electric charge stored in the light-sensitive device 141 ("a to b" in FIG. 15). Subsequently, the reset pulse is provided ("c" in FIG. 15) to cause the first signal output line to output the reset voltage ("d" in FIG. 15).

5.2 Summary

As described above, the third modification of the present invention is capable of applying the pixel circuit without a read transistor.

Note that the above embodiments and modifications are described using amplifying MOS transistors as examples. However, the present invention is applicable to various kinds of image pickup apparatuses that require fixed pattern noise elimination circuits such as CMD (Charge-Modulation Device), BASIS (Bipolar Imaging Device), SIT (Static Induction Transistor) and such.

INDUSTRIAL APPLICABILITY

The present invention is applicable to image pickup systems such as home video cameras and digital still cameras. The present invention is capable of providing solid-state image pickup devices which cause less residual signal charges even if the surface area of each unit pixel is reduced, and making a contribution to enhancement of image quality and cost reduction of such image pickup systems.

Furthermore, the present invention is applicable not only to home image pickup systems but also to various kinds of image pickup systems.

What is claimed is:

1. An image pickup system comprising an image pickup device and a signal processing apparatus, for outputting luminance information corresponding to an amount of received light to an apparatus used in a subsequent stage, wherein
    the image pickup device includes:
        an image pickup unit in which a plurality of unit cells are arranged in a one- or two-dimensional array, each of the plurality of unit cells including a photoelectric converter corresponding to a single pixel and an output unit operable to generate and output a reset voltage according to an output voltage from the photoelectric converter at an initialization as well as a read voltage according to an output voltage from the photoelectric converter corresponding to the amount of the received light;
        a differential voltage generating unit operable to generate, with respect to each of the plurality of unit cells, a differential voltage according to a difference between the reset voltage and the read voltage; and
        a device output unit operable to output, with respect to each of the plurality of unit cells, the read voltage and the differential voltage to the signal processing apparatus, and
    the signal processing apparatus includes:
        a designating unit operable to designate, from among the plurality of unit cells, two or more unit cells as correction targets based on a judgment of whether read voltages outputted by the device output unit for the plurality of unit cells are respectively within a predetermined range; and
        a system output unit operable to output, for a unit cell being not one of the designated unit cells, the differential voltage of the unit cell as luminance information corresponding to the unit cell, and output, for a unit cell being one of the designated unit cells, a predetermined voltage indicating high luminance as luminance information corresponding to the unit cells,
    wherein the designating unit includes:
        a judging unit operable to make the judgment; and
        a selecting unit operable to select, from among unit cells having read voltages judged as not being within the predetermined range, two or more unit cells as the correction targets based on differential voltages outputted by the device output unit for the plurality of unit cells.

2. The image pickup system of claim 1, wherein the selecting unit extracts one or more portions on the array and selects unit cells in the portions as the correction targets, the portions being within areas in each of which unit cells having the read voltages judged as not being within the predetermined range are spatially contiguous, and each of the portions being composed of spatially contiguous unit cells that have the differential voltages being not a saturation voltage as well as having adjoining unit cells containing one or more unit cells that have the differential voltages being the saturation voltage.

3. The image pickup system of claim 1, wherein
    the device output unit includes:
        a read voltage output unit operable to output read voltages generated by the plurality of unit cells to the signal processing apparatus; and
        a differential voltage output unit operable to output differential voltages generated by the differential voltage generating unit for the plurality of unit cells to the signal processing apparatus, and
    the read voltage output unit and the differential voltage output unit are positioned symmetrically to each other with a center at the image pickup unit.

4. The image pickup system of claim 1, wherein
    the differential voltage generating unit includes:
        a first output line for outputting reset voltages and read voltages generated by the plurality of unit cells;
        a second output line for outputting the luminance information to the apparatus in the subsequent stage;
        a clamp capacity connected in series between the first and the second output line;
        a sampling capacity connected in series between the second output line and a predetermined voltage terminal; and
    a clamp transistor connected in series between the second output line and a reference voltage terminal,
    the image pickup unit transfers voltages retained in the clamp capacity as the read voltages to the device output unit via the first output line, and
    the differential voltage generating unit transfers voltages retained in the sampling capacity as differential voltages generated for the plurality of unit cells to the device output unit via the second output line.

5. The image pickup system of claim 4, wherein
    the image pickup unit includes:
        select transistors, each of which is connected in series between one of the plurality of unit cells and the first output line and used for selecting the unit cell;
        a load circuit operable to apply a load to the first output line, and used for reading the output voltage; and
        a loading transistor connected in series between the first output line and the load circuit, and
    the image pickup system further comprising:
        a control unit operable to retain the read voltages generated by the plurality of unit cells in the first output line by turning off the loading transistor to thereby cut off the load circuit in advance of setting the plurality of unit cells to a non-conducting state by turning off the select transistors.

6. The image pickup system of claim 4, wherein
    the differential voltage generating unit further includes:
        a sampling transistor positioned between the first output line and the clamp capacity, and
    the device output unit includes:
        a read voltage output unit having an input terminal connected between the sampling transistor and the clamp capacity, operable to amplify the read voltages outputted by the differential voltage generating unit to output to the signal processing apparatus.

7. A signal processing apparatus for receiving a reset voltage and a differential voltage of each of a plurality of unit cells from an image pickup device, and processing the reset and the differential voltages, the reset voltage corresponding to an output voltage from a photoelectric converter at an initialization, and the differential voltage corresponding to a difference between the reset voltage and a read voltage according to an output voltage from the photoelectric converter corresponding to an amount of received light, the signal processing apparatus comprising:
    a designating unit operable to designate, from among the plurality of unit cells, two or more unit cells as correction targets based on a judgment of whether read voltages outputted from the image pickup device for the plurality of unit cells are respectively within a predetermined range; and an output unit operable to output, for a unit cell being not one of the designated unit cells, the differential voltage of the unit cell as luminance information corresponding to the unit cell, and output, for a unit cell being one of the designated unit cells, a predetermined voltage indicating high luminance as luminance information corresponding to the unit cells, wherein the designating unit includes:
- a judging unit operable to make the judgment; and
- a selecting unit operable to select, from among unit cells having read voltages judged as not being within the predetermined range, two or more unit cells as the correction targets based on differential voltages outputted by the image pickup device for the plurality of unit cells.

8. The signal processing apparatus of claim 7, wherein the selecting unit extracts one or more portions on the array and selects unit cells in the portions as the correction targets, the portions being within areas in each of which unit cells having the read voltages judged as not being within the predetermined range are spatially contiguous, and each of the portions being composed of spatially contiguous unit cells that have the differential voltages being not a saturation voltage as well as having adjoining unit cells containing one or more unit cells that have the differential voltages being the saturation voltage.

9. A signal processing method for receiving a reset voltage and a differential voltage of each of a plurality of unit cells from an image pickup device, and processing the reset and the differential voltages, the reset voltage corresponding to an output voltage from a photoelectric converter at an initialization, and the differential voltage corresponding to a difference between the reset voltage and a read voltage according to an output voltage from the photoelectric converter corresponding to an amount of received light, the signal processing method comprising the steps of:

(a) designating, from among the plurality of unit cells, two or more unit cells as correction targets based on a judgment of whether read voltages outputted from the image pickup device for the plurality of unit cells are respectively within a predetermined range; and (b) outputting, for a unit cell being not one of the designated unit cells, the differential voltage of the unit cell as luminance information corresponding to the unit cell, and output, for a unit cell being one of the designated unit cells, a predetermined voltage indicating high luminance as luminance information corresponding to the unit cells, wherein the step (a) includes the sub-steps of:
(c) making the judgment; and
(d) selecting, from among unit cells having read voltages judged as not being within the predetermined range, two or more unit cells as the correction targets based on differential voltages outputted by the device output unit for the plurality of unit cells.

10. The signal processing method of claim 9, wherein the sub-step (d) extracts one or more portions on the array and selects unit cells in the portions as the correction targets, the portions being within areas in each of which unit cells having the read voltages judged as not being within the predetermined range are spatially contiguous, and each of the portions being composed of spatially contiguous unit cells that have the differential voltages being not a saturation voltage as well as having adjoining unit cells containing one or more unit cells that have the differential voltages being the saturation voltage.

* * * * *